US011952857B2

(12) United States Patent
Davis et al.

(10) Patent No.: US 11,952,857 B2
(45) Date of Patent: Apr. 9, 2024

(54) LOCKING PIN TOOL FOR USE WITH A LOCKING PIN OF A WELLHEAD

(71) Applicant: Ripen Pull, LLC, Whitehouse, TX (US)

(72) Inventors: Dustin Davis, Whitehouse, TX (US); Christopher Whitton, Tyler, TX (US)

(73) Assignee: Ripen Pull, LLC, Whitehouse, TX (US)

( * ) Notice: Subject to any disclaimer, the term of this patent is extended or adjusted under 35 U.S.C. 154(b) by 504 days.

(21) Appl. No.: 17/088,016

(22) Filed: Nov. 3, 2020

(65) Prior Publication Data

US 2022/0136357 A1 May 5, 2022

(51) Int. Cl.

| | |
|---|---|
| ***B25D 1/16*** | (2006.01) |
| ***B25B 5/10*** | (2006.01) |
| ***B25B 27/02*** | (2006.01) |
| ***E21B 33/068*** | (2006.01) |
| *E21B 33/038* | (2006.01) |

(52) U.S. Cl.

CPC ............ *E21B 33/068* (2013.01); *B25B 5/102* (2013.01); *B25B 27/02* (2013.01); *B25D 1/16* (2013.01); *E21B 33/038* (2013.01)

(58) Field of Classification Search

CPC ..... E21B 33/068; E21B 33/038; B25B 5/102; B25B 27/02; B25D 1/16

See application file for complete search history.

(56) References Cited

U.S. PATENT DOCUMENTS

| | | | |
|---|---|---|---|
| 2,187,839 | A | 1/1940 | Penick et al. |
| 2,232,884 | A | 2/1941 | Penick et al. |
| 2,313,169 | A | 3/1943 | Penick et al. |
| 2,456,081 | A | 12/1948 | Penick |
| 2,589,483 | A | 3/1952 | Eckel et al. |
| 2,617,485 | A | 11/1952 | Thatch |
| 2,768,841 | A | 10/1956 | Allen |
| 3,084,745 | A | 4/1963 | Floyd |

(Continued)

FOREIGN PATENT DOCUMENTS

| | | |
|---|---|---|
| CN | 201723705 U | 1/2011 |
| CN | 202176317 U | 3/2012 |

(Continued)

OTHER PUBLICATIONS

YouTube Video https://www.youtube.com/watch?v=sqxC6F0rFp0, Pub. Aug. 13, 2017.

(Continued)

*Primary Examiner* — Nirvana Deonauth

(74) *Attorney, Agent, or Firm* — Grady K. Bergen; Griggs Bergen LLP

(57) ABSTRACT

A locking pin tool to facilitate removal and/or installation of locking pins of a well head assembly includes an elongated shaft and a jaw assembly configured for engaging an end of a locking pin. A hammer body is mounted on the shaft and is movable along the shaft. A hammer stop provided on the shaft engages the hammer body to absorb a striking force from the hammer body as the hammer body is moved along the shaft towards the hammer stop. By moving the hammer body along the shaft, the hammer strikes the hammer stop to impart a force on the locking pin to facilitate removal or installation of the locking pin.

20 Claims, 5 Drawing Sheets

(56) References Cited

U.S. PATENT DOCUMENTS

| | | | | |
|---|---|---|---|---|
| 3,185,505 | A | 5/1965 | Lanmon, II | |
| 3,494,638 | A | 2/1970 | Todd et al. | |
| 4,299,395 | A | 11/1981 | Reed | |
| 4,919,459 | A | 4/1990 | Miller | |
| 7,861,622 | B2 | 1/2011 | Chervenak et al. | |
| 8,407,874 | B2 * | 4/2013 | Giberti | B25F 1/003 81/367 |
| 8,544,551 | B2 | 10/2013 | Nguyen et al. | |
| 10,183,386 | B2 | 1/2019 | Peterson et al. | |

FOREIGN PATENT DOCUMENTS

| | | | |
|---|---|---|---|
| CN | 202825760 | U | 3/2013 |
| CN | 202934530 | U | 5/2013 |
| CN | 205033156 | U | 2/2016 |
| CN | 108068051 | A | 5/2018 |
| CN | 209007463 | U | 6/2019 |
| CN | 110065026 | A | 7/2019 |
| CN | 209440059 | U | 9/2019 |
| DE | 102010025105 | A1 | 12/2011 |
| EP | 0208048 | B1 | 11/1990 |
| EP | 0202726 | B1 | 4/1992 |

OTHER PUBLICATIONS

YouTube Video https://www.youtube.com/watch?v=VPqOZ7qxe0U, Pub. Jun. 16, 2018.

SKF Internal bearing puller kits https://www.skf.com/us/products/maintenance-products/mechanical-tools-for-mounting-and-dismounting/bearing-pullers/internal-pullers, Accessed Aug. 17, 2020.

YouTube Video https://www.youtube.com/watch?v=27YCUMzKcfE, Pub. Mar. 30, 2013.

* cited by examiner

LOCKING PIN TOOL FOR USE WITH A LOCKING PIN OF A WELLHEAD

BACKGROUND

In oil and gas wells, sealing assemblies or packings are used within wellheads to seal the annular space between the well casings and/or tubings. FIG. 1 shows an example of a wellhead 10, such as that of an oil and gas well. Locking pin or screw assemblies 12 are typically used to compress, actuate or energize the seals or packing materials within the sealing assemblies of these wellheads. The locking pins may also be used in wellheads, casing or tubing heads, casing spools, etc., to hold or lockdown casing or tubing hangers or other structures located within the wellhead or to serve other purposes.

These locking pin assemblies 12 are circumferentially spaced around the wellhead 10 and extend radially through internally threaded openings 14 from the exterior of the wellhead into the wellhead interior, such as the annular space between the well casing and well tubing, where they engage the annular seals or packing materials at their inner ends. Examples of these locking pin assemblies and similar devices can be seen, for example, in U.S. Pat. No. 2,232,884, referred to as jack screw 22, in U.S. Pat. No. 4,919,459, as lockdown screw 7, in U.S. Pat. No. 8,544,551, as lockdown pin 28, in EP0208048B1, as lockdown screw 202, and in EP0202726B1, as tie down screws 28a and 28b, each of the aforementioned patents being hereby incorporated herein by reference for all purposes, including disclosing various locking pin assemblies and similar devices and the associated wellhead and sealing or other structures with which they are used.

Periodically these locking pin assemblies 12 must be removed from the wellhead and replaced. A locking pin stem 16 is threaded into a threaded bore of a screw box or gland nut 18 of the locking pin assembly 12. The screw box or gland nut has external threads and is itself threaded into opening 14 of the wellhead 10 and has exposed nut flats on its outer end to facilitate screwing the nut 18 into and out of the threaded portion of opening 14.

The outer end of the locking pin stem 16 is also provided with nut flats that may be in a square, hexagonal, or octagonal configuration. The outer end of the pin 16 is usually sized as a ½-inch, ¾-inch, or 1-inch nut. During removal, the locking pin stem 16 is first unthreaded from the gland nut 18 by rotating the locking pin 16 using the nut flats on the outer end of the pin 16. The gland nut 18 is then unthreaded from the threaded opening 14. Even though both the locking pin 16 and gland nut 18 of the locking pin assembly 12 are unthreaded, difficulty is often encountered in fully removing the locking pin 16 or locking pin assembly 14 because the inner end of the locking pin 16 may still remain embedded in or be adhered to the seal or packing material within the wellhead.

To fully remove the embedded locking pin 16 or locking pin assembly 12, after it has been unscrewed, it must be pulled out radially from the wellhead 10 through opening 14. Current techniques typically involve using a pipe or monkey wrench (not shown) to grip the nut flats on outer end of the pin 16 and then using a hammer or other tool to hit the secured pipe or monkey wrench to provide sufficient outward radial force so that the pin 16 or pin assembly 12 is dislodged from the seal or packing material and pulled out through opening 14. Because there are usually multiple locking pin assemblies that must be removed, this process is very inefficient, time consuming, and can result in damage to nearby equipment or possible injury to persons involved in trying to dislodge/remove the pin.

Accordingly, the present invention provides a tool and method for removing locking pins from wellheads, casing or tubing heads, casing spools, etc. that overcomes these shortcomings.

BRIEF DESCRIPTION OF THE DRAWINGS

For a more complete understanding of the embodiments described herein, and the advantages thereof, reference is now made to the following descriptions taken in conjunction with the accompanying figures, in which.

DETAILED DESCRIPTION

Figure 2:
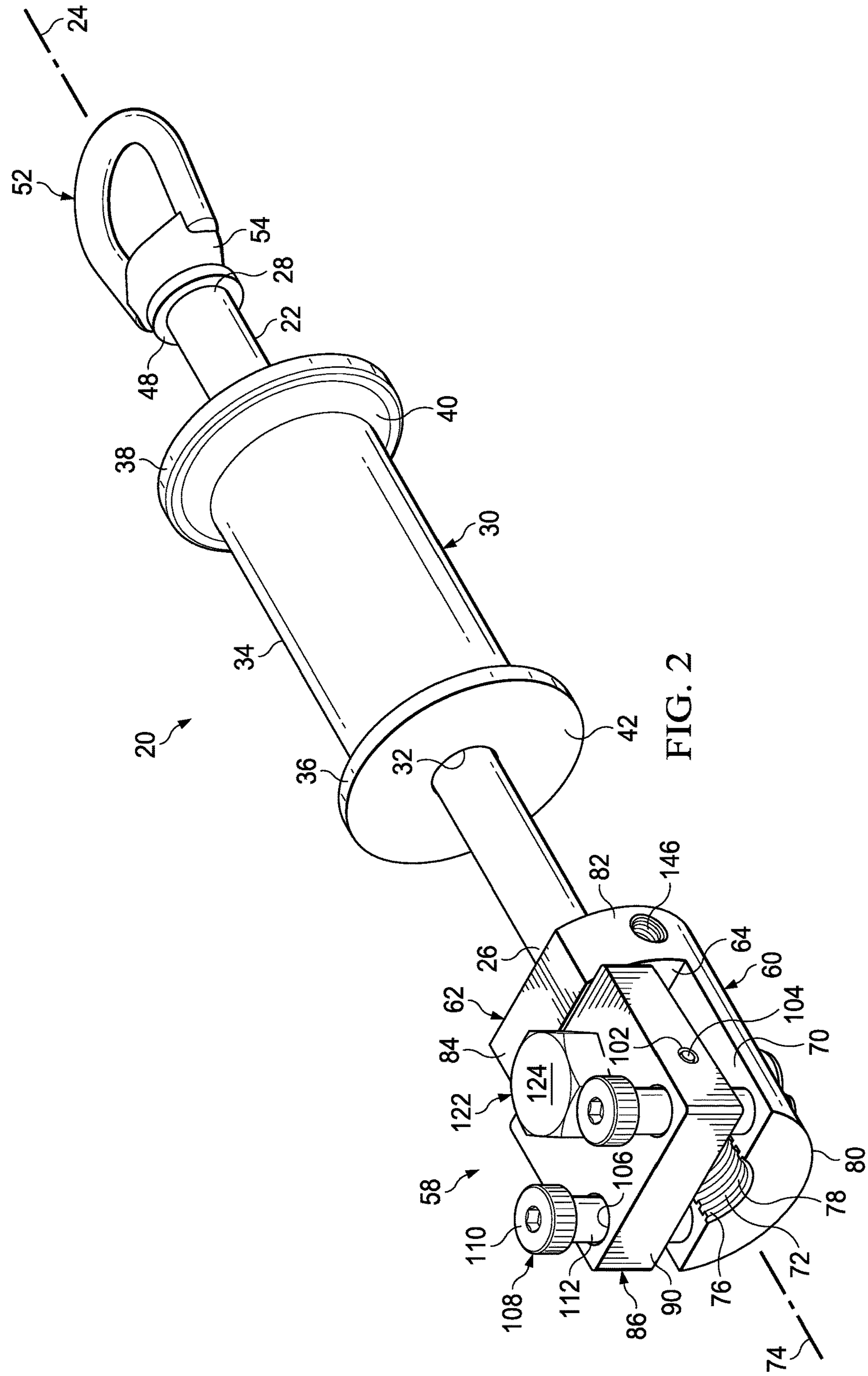
FIG. 2 is a front perspective view of a locking pin tool for the removal and/or installation of locking pin assemblies, such as those of FIG. 1, and that is constructed in accordance with particular embodiments of the invention.

Referring to FIG. 2, a locking pin removal/installation tool 20 is shown. The tool 20 includes an elongated shaft 22 having a central longitudinal axis 24 that extends through opposite front and rear ends 26, 28, respectively, of the shaft 22. A slide weight or hammer body 30 is mounted on the shaft 22 or otherwise engages the shaft 22 and is movable along and/or upon the shaft 22 along lines parallel to the longitudinal axis 24 of the shaft 22.

The shaft 22 is typically a straight member having an overall length of from 8 inches to 24 inches, with from 10 inches to 15 inches being useful in many instances. In particular embodiments, the shaft 22 may have an overall length that may be at least equal to, and/or between any two of 8 inches, 9 inches, 10 inches, 11 inches, 12 inches, 13 inches, 14 inches, 15 inches, 16 inches, 17 inches, 18 inches, 19 inches, 20 inches, 21 inches, 22 inches, 23 inches, and 24 inches. The length of the shaft 22 may vary, however, depending upon the size and configuration of the locking pin with which it is used and/or the hammer body 30 and the degree of movement needed for the hammer body 30 to move or slide along the shaft 22 to provide a sufficient striking force to facilitate removal and/or installation of the locking pin during use of the tool 20.

It should be noted in the description, if a numerical value or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, “a range of from 1 to 10” is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that inventor possesses the entire range and all points within the range.

The shaft 22 is shown as being cylindrical, having a uniform circular transverse cross section along all or most of its length. In other embodiments, the shaft 22 may have a non-circular transverse cross section, such as oval, polygonal (e.g., square, hexagonal, etc.), or other configurations (e.g., U-shaped, V-shaped, T-shaped, +-shaped, etc.), which may also be uniform in transverse cross-section configuration along all or most of the length of the shaft 22. In other embodiments, the transverse cross section of the shaft 22 may be uniform along only a portion, which may be a major portion, of its length. The overall diameter or overall width of the shaft 22 may range from ¼ inch to 1¾ inch, with from ½ inch to 1 inch being useful in many instances. In particular embodiments, the shaft 22 may have a diameter or overall width that may be at least equal to, and/or between any two of ¼ inch. ½ inch, ¾ inch, 1 inch, 1¼ inch, 1½ inch, and 1¾ inch.

The hammer body 30 is provided with a central bore 32 that extends through the length of the hammer body 30 and that is sized and configured to receive the shaft 22 so that the hammer body 30 is retained on and movable along the shaft 22 between the opposite ends 26, 28. The bore 32 may be sized with a slightly larger diameter (e.g., from 0.01 inch to 0.25 inch) than the shaft 22 to allow the body 30 to slide freely along the shaft 22 but minimize lateral or side-to-side movement of the hammer body 30 upon the shaft 22. In some embodiments, instead of a bore, the hammer body 30 may be provided with a channel, track or other configuration to receive and engage the shaft 22, such as may be used to cooperate with non-circular shaft configurations, which allows sliding engagement of the hammer body 30 with the shaft 22 so that the hammer body 30 is retained on and can slide along the length of the shaft 22.

The hammer body 30 is configured for manually grasping and quickly sliding the hammer body 30 along the shaft 22. The hammer body 30 may be configured with a central portion 34 having an exterior that is sized and configured to allow a user to readily grasp the central portion 34. In the embodiment shown, the central portion 34 is generally cylindrical, having a uniform diameter or width along its length. In other embodiments, the central portion 34 may have a non-uniform diameter along its length and may be non-cylindrical. The length and width of the central portion 34 may vary, but a suitable length may range from 3½ inches to 12 inches and a suitable diameter or width may range from 1 inch to 3 inches. In certain embodiments, the central portion 34 may be knurled, texturized, provided with finger grooves, etc., to facilitate forming a secure grip on the central portion 34. In other embodiments, the central portion 34 may have a smooth surface.

In some embodiments, the hammer body 30 may have forward and rearward end portions 36, 38 formed at one or both ends of the central portion 34 that project radially outward from the central portion 34. The end portions 36, 38 are shown as having a frusto-conical tapered portion 40 that flares radially outward from the ends of central portion 34 and terminates in a striking face, surface or end portion 42 of the hammer body 30 at the very end of the end portions 36, 38. The striking face, surface or portion 42 may be a flat or planar surface that is perpendicular to the shaft 22 and/or its longitudinal axis 24, or it may have other configurations.

It should be understood that terms of orientation used herein, such as “rear,” “rearward,” “front,” “forward,” “upper,” “lower,” etc., have been used for ease of description. These terms have been used consistently throughout the description as they relate to the tool 20 and its components and their relative relationship. Such terms should not, however, be construed in any limiting sense unless it is expressly stated so or is readily apparent from their context.

The hammer body 30 should have a sufficient weight, strength and hardness to provide a sufficient impacting or striking force to facilitate removal/installation of the locking pin, as is described herein, and so the hammer body 30 is not damaged or deformed repeated hammering or use. In certain embodiments, the hammer body 30 may have a weight of from 1.5 lbs to 15 lbs. In particular applications, the hammer body 30 may have a weight at least equal to, and/or between any two of 1.5 lbs, 2 lbs, 2.5 lbs, 3 lbs, 3.5 lbs, 4 lbs, 4.5 lbs, 5 lbs, 5.5 lbs, 6 lbs, 6.5 lbs, 7 lbs, 7.5 lbs, 8 lbs, 8.5 lbs, 9 lbs, 9.5 lbs, 10 lbs, 10.5 lbs, 11 lbs, 11.5 lbs, 12 lbs, 12.5 lbs, 13 lbs, 13.5 lbs, 14 lbs, 14.5 lbs, and 15 lbs.

Figure 3:
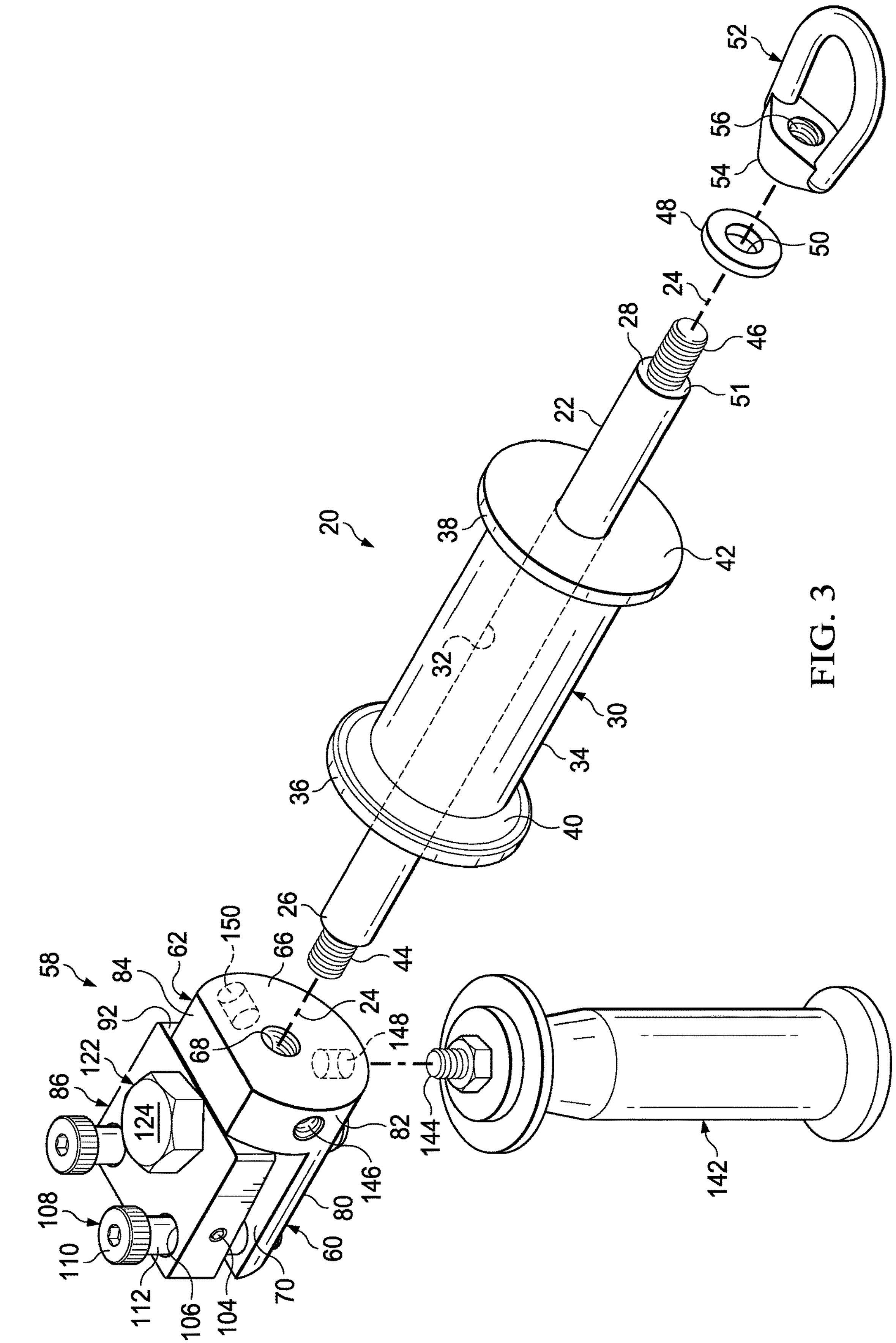
FIG. 3 is a rear perspective view of the locking pin tool of FIG. 2, shown with various components of the locking pin tool exploded apart.

Referring to FIG. 3, the ends 26, 28 of the shaft 22 may be provided with externally threaded portions 44, 46 that project from one or both ends 26, 28, respectively, of the shaft 22.

A hammer stop 48 is provided on the rear end 28 of the shaft 22. The hammer stop 48 is configured and oriented so that it provides a striking surface or portion against which the striking face or portion 42 of tapered end portion 40 of the hammer body 30 contacts and engages. The hammer stop 48 may be used to absorb a striking force from the hammer body 30, as the hammer body 30 is moved along the shaft 22 to the hammer stop 48. The hammer stop 48 may have a variety of configurations. In the embodiment shown, the hammer stop 48 is configured as a ring or collar having a central opening 50 that receives the threaded end portion 46 and abuts against a shoulder 51 formed by the rear end 28 of the shaft 22 and the longitudinally projecting threaded portion 46.

The outer perimeter of the hammer stop 48 may have a diameter or width greater than the rearward end 28 of the shaft 22 so that it projects radially outward from the exterior surface of the shaft 22 around all or a portion of its perimeter. Furthermore, the outer perimeter of the hammer stop 48 may have a diameter or width greater than the central bore 32 of the hammer body 30 and may have a diameter or width that is the same, greater or less than that of the striking face or portion 42. In certain applications, the hammer stop 48 can be internally threaded on the central opening 50 and can be threaded on threaded end portion 46 so that it is used to both retain the hammer body 30 on the shaft 22 and provide a striking surface. Nut flats or other engagement portions may be provided on the hammer stop 48 to facilitate tightening or loosening the hammer stop 48 on threaded portion 46. In the embodiment shown, the hammer stop 48 is not threaded internally but merely receives the threaded portion 46.

In some embodiments, a coupling device 52 is also provided on the rearward end 28 of the shaft 22 to facilitate coupling the locking pin tool 20 to an object. The coupling device 52 may be in the form of a hook, loop, ring, or other device that is configured for coupling to various objects, such as a chain, rope, line, cable, storage hook or peg, etc.

The coupling device 52 is provided with a collar 54 having a threaded bore 56 that is configured to thread onto the threaded end portion 46 so that it secures to the rear end 28 of the shaft 22. The threaded collar 54 also abuts against and secures and retains the hammer stop 48 on the shaft end 28. In certain embodiments, the hammer stop 48 may be eliminated and the coupling device 52 or a portion thereof may be used both to secure the coupling device 52 to the shaft 22 and act as the hammer stop, with the collar 54 of the coupling device 52 or portions thereof serving as the hammer stop 48.

In addition to retaining the hammer stop 48 on shaft 22 or forming the hammer stop itself, the coupling device 52 may also be used as a means for exerting a force on the shaft 22 by coupling the device 52 to a wench, come-along, pulley, vehicle hitch, etc., that can be used to facilitate pulling or providing a radially- or longitudinally-directed force on the locking pin on which the tool 20 is used to assist in removing the locking pin. It can also be used to hang or secure the locking pin tool 20 on a peg, hook, or other storage device.

As shown in FIG. 2, a jaw assembly 58 is coupled to the forward end 26 of the shaft 22. The jaw assembly 58 includes a lower jaw body 60 (FIG. 4) that extends from a jaw head 62 that is coupled to the shaft end 26. As shown in FIG. 3, the jaw head 62 may be configured as a block or member that may have planar opposite forward and rear faces 64, 66 that are spaced apart across the thickness of the jaw head 62. The faces 64, 66 may be parallel to one another and perpendicular to the axis 24 of the shaft 22, when the jaw head 62 is coupled thereto. In the embodiment shown, a threaded aperture 68 is formed in the rearward face 66 for receiving and coupling to the threaded end 44 of shaft 22. Other means or fasteners for releasably or non-releasably coupling the jaw head 62 and jaw assembly 58 to the shaft 22 may also be used. In certain embodiments, the jaw head 62 may be permanently coupled to the shaft 22 or integral with the shaft 22. The jaw head 62 can have other configurations to that shown, as well, provided it provides the functioning described herein.

The lower jaw body 60 projects forward from the jaw head 62 at the lower end of the jaw head 62 and forward from the forward face 64. In some embodiments, the jaw body 60 may be integrally formed, such as through machining, molding, etc., with the jaw head 62. The lower jaw body 60 has a lower jaw face 70 that faces upward. The lower jaw face 70 is shown as being a planar face that is laterally spaced from and extends parallel to the central longitudinal axis 24 of the shaft 22, when the jaw assembly 58 is coupled thereto.

The lower jaw face 70 is provided with a concave arcuate channel or recess 72 that has a longitudinal axis 74 that is parallel to the longitudinal axis 24 of the shaft. The channel or recess 72 may have an overall radius R of curvature that is from 0.2 inch to 2.0 inches. The configuration of the concave channel or recess 72 may be represented by the Equation (1) below:

$$R=W^2/8D+D/2 \tag{1}$$

where R is the radius of curvature as measured from the center of curvature, W is the transverse width of channel (i.e., chord width), and D is the depth (i.e., chord depth) of the channel as measured from the jaw face surface 70. In certain embodiments, the radius of curvature R may be at least equal to, and/or between any two of 0.2 inch, 0.3 inch, 0.4 inch, 0.5 inch, 0.6 inch, 0.7 inch, 0.8 inch, 0.9 inch, 1.0 inch, 1.1 inches, 1.2 inches, 1.3 inches, 1.4 inches, 1.5 inches, 1.6 inches, 1.7 inches, 1.8 inches, 1.9 inches, and 2.0 inches. When the jaw assembly 58 is coupled to the shaft 22, the radius of curvature R may originate from a center of curvature that is coincident with the longitudinal axis 24 of the shaft 22 or the center of curvature may be offset above or below the longitudinal axis 24 of the shaft 22.

The depth D of the concave channel 72 may range from 0.2 inch to 0.80 inch. In certain instances, the depth D of the concave channel 72 may be at least equal to, and/or between any two of 0.20 inch, 0.21 inch, 0.22 inch, 0.23 inch, 0.24 inch, 0.25 inch, 0.26 inch, 0.27 inch, 0.28 inch, 0.29 inch, 0.30 inch, 0.31 inch, 0.32 inch, 0.33 inch, 0.34 inch, 0.35 inch, 0.36 inch, 0.37 inch, 0.38 inch, 0.39 inch, 0.40 inch, 0.40 inch, 0.41 inch, 0.42 inch, 0.43 inch, 0.44 inch, 0.45 inch, 0.46 inch, 0.47 inch, 0.48 inch, 0.49 inch, 0.50 inch, 0.51 inch, 0.52 inch, 0.53 inch, 0.54 inch, 0.55 inch, 0.56 inch, 0.57 inch, 0.58 inch, 0.59 inch, 0.60 inch, 0.61 inch, 0.62 inch, 0.63 inch, 0.64 inch, 0.65 inch, 0.66 inch, 0.67 inch, 0.68 inch, 0.69 inch, 0.70 inch, 0.71 inch, 0.72 inch, 0.73 inch, 0.74 inch, 0.75 inch, 0.76 inch, 0.77 inch, 0.78 inch, 0.79 inch, and 0.80 inch.

The width W of the concave channel 72 may range from 0.4 inch to 3.0 inches. In some embodiments, the width W of the concave channel 72 may be at least equal to, and/or between any two of 0.4 inch, 0.5 inch, 0.6 inch, 0.7 inch, 0.8 inch, 0.9 inch, 1.0 inch, 1.1 inches, 1.2 inches, 1.3 inches, 1.4 inches, 1.5 inches, 1.6 inches, 1.7 inches, 1.8 inches, 1.9 inches, 2.0 inches, 2.1 inches, 2.2 inches, 2.3 inches, 2.4 inches, 2.5 inches, 2.6 inches, 2.7 inches, 2.8 inches, 2.9 inches, and 3.0 inches.

The longitudinal length of the channel 72 may range from 0.5 inch to 3.0 inches. In certain instances, the length of the concave channel 72 may be at least equal to, and/or between any two of 0.5 inch, 0.6 inch, 0.7 inch, 0.8 inch, 0.9 inch, 1.0 inch, 1.1 inches, 1.2 inches, 1.3 inches, 1.4 inches, 1.5 inches, 1.6 inches, 1.7 inches, 1.8 inches, 1.9 inches, 2.0 inches, 2.1 inches, 2.2 inches, 2.3 inches, 2.4 inches, 2.5 inches, 2.6 inches, 2.7 inches, 2.8 inches, 2.9 inches, and 3.0 inches.

Of course, the above-described sizes and dimensions may be varied for the channel 72. Such sizes and dimensions may be varied depending upon the type and size of locking pin the tool 20 is to be used with. Accordingly, the above-discussed dimensions may be less or more if the dimensions of the locking pin end with which the tool 20 is used are smaller or greater than those commonly used. For typical locking pins, a concave channel 72 having a radius R of curvature approximately 0.5 inch, a width W of approximately 1 inch, and a depth D of approximately 0.5 inch has been found particularly useful for all the commonly sized locking pin stem ends of ½-inch, ¾-inch, or 1-inch configured with either a square, hexagonal, or octagonal nut flat arrangement, as typically found on locking pins.

In certain embodiments, the channel or recess 72 may be non-arcuate and be configured differently, such as a polygonal configuration (e.g., square, rectangular, hexagonal, octagonal, etc.) that may be sized and configured to engage particular nut flats or nut flat corners of locking pins.

The surface of the channel or recess 72 may be knurled, texturized or otherwise configured to facilitate gripping of the nut end of the locking pin on which it is used. In the embodiment shown, the concave arcuate channel or recess 72 is provided with a series of circumferential grooves or teeth 76 that are longitudinally spaced apart along all or a portion of the length of the channel 72 and extend along all or a portion of the width of the channel 72. The height of these teeth 76 (or depth of grooves) may range from 0.01 inch to 0.30 inch, with the height of the teeth 76 being the same or different along the length or portions of the length of the channel 72. In particular embodiments, the height of the teeth 76 may be at least equal to, and/or between any two of 0.01 inch, 0.02 inch, 0.03 inch, 0.04 inch, 0.05 inch, 0.06 inch, 0.07 inch, 0.08 inch, 0.09 inch, 0.10 inch, 0.11 inch, 0.12 inch, 0.13 inch, 0.14 inch, 0.15 inch, 0.16 inch, 0.17 inch, 0.18 inch, 0.19 inch, 0.20 inch, 0.21 inch, 0.22 inch, 0.23 inch, 0.24 inch, 0.25 inch, 0.26 inch, 0.27 inch, 0.28 inch, 0.29 inch, and 0.30 inch.

The teeth 76 may have a transverse width of from 0.01 inch to 0.30 inch. In certain instances, the width of the teeth 76 may be at least equal to, and/or between any two of 0.01 inch, 0.02 inch, 0.03 inch, 0.04 inch, 0.05 inch, 0.06 inch, 0.07 inch, 0.08 inch, 0.09 inch, 0.10 inch, 0.11 inch, 0.12 inch, 0.13 inch, 0.14 inch, 0.15 inch, 0.16 inch, 0.17 inch, 0.18 inch, 0.19 inch, 0.20 inch, 0.21 inch, 0.22 inch, 0.23 inch, 0.24 inch, 0.25 inch, 0.26 inch, 0.27 inch, 0.28 inch, 0.29 inch, and 0.30 inch. The teeth 76 may be longitudinally spaced apart in the channel 72 a distance of from 0.01 inch to 0.30 inch, as measured from the same or similar point on the next adjacent tooth 76. In particular embodiments, the teeth 76 may be spaced apart a distance that may be at least equal to, and/or between any two of 0.01 inch, 0.02 inch, 0.03 inch, 0.04 inch, 0.05 inch, 0.06 inch, 0.07 inch, 0.08 inch, 0.09 inch, 0.10 inch, 0.11 inch, 0.12 inch, 0.13 inch, 0.14 inch, 0.15 inch, 0.16 inch, 0.17 inch, 0.18 inch, 0.19 inch, 0.20 inch, 0.21 inch, 0.22 inch, 0.23 inch, 0.24 inch, 0.25 inch, 0.26 inch, 0.27 inch, 0.28 inch, 0.29 inch, and 0.30 inch.

The teeth 76 define grooves 78 of the channel 72, which have a depth corresponding to the height of the teeth 76 and width corresponding to the longitudinal spacing of the teeth 76. In the embodiment shown, the teeth 76 have a rectangular transverse cross section, so that they are flat on the top or upper surface of each tooth 76. In other embodiments, all or some of the teeth 76 may be tapered along their height so that they terminate at a narrower width or peak. The teeth 76 should be formed of a sufficiently hard material and be configured so that they are not readily deformed or damaged during use and provide an effective bite or grip upon the locking pin end on which it is used.

The lower jaw body 60 is shown as having a convex arcuate or curved lower exterior surface 80 that extends and smoothly joins the jaw head 62, which may have a similarly curved exterior surface 82. The lower end and sides of the jaw head 62 may also be convexly curved so that the exterior side surfaces of the jaw head 62 and lower jaw body 60 are partially cylindrical in shape, with the radius of curvature of the exterior surfaces 80, 82 and the center of curvature being the same. The top portion or upper surface 84 jaw head 62 is shown as being flat or planar and parallel to the lower jaw face 70. It may be oriented and configured differently, however, such as a continuation of the surface 82 such that the upper surface 84 is also curved so that the entire outer perimeter of the jaw head 62 is circular or cylindrical. The exterior surfaces of the lower jaw body 60 and jaw head 62 may be configured differently, however, with all or a portions of the exterior being arcuate or non-arcuate.

Figure 4:
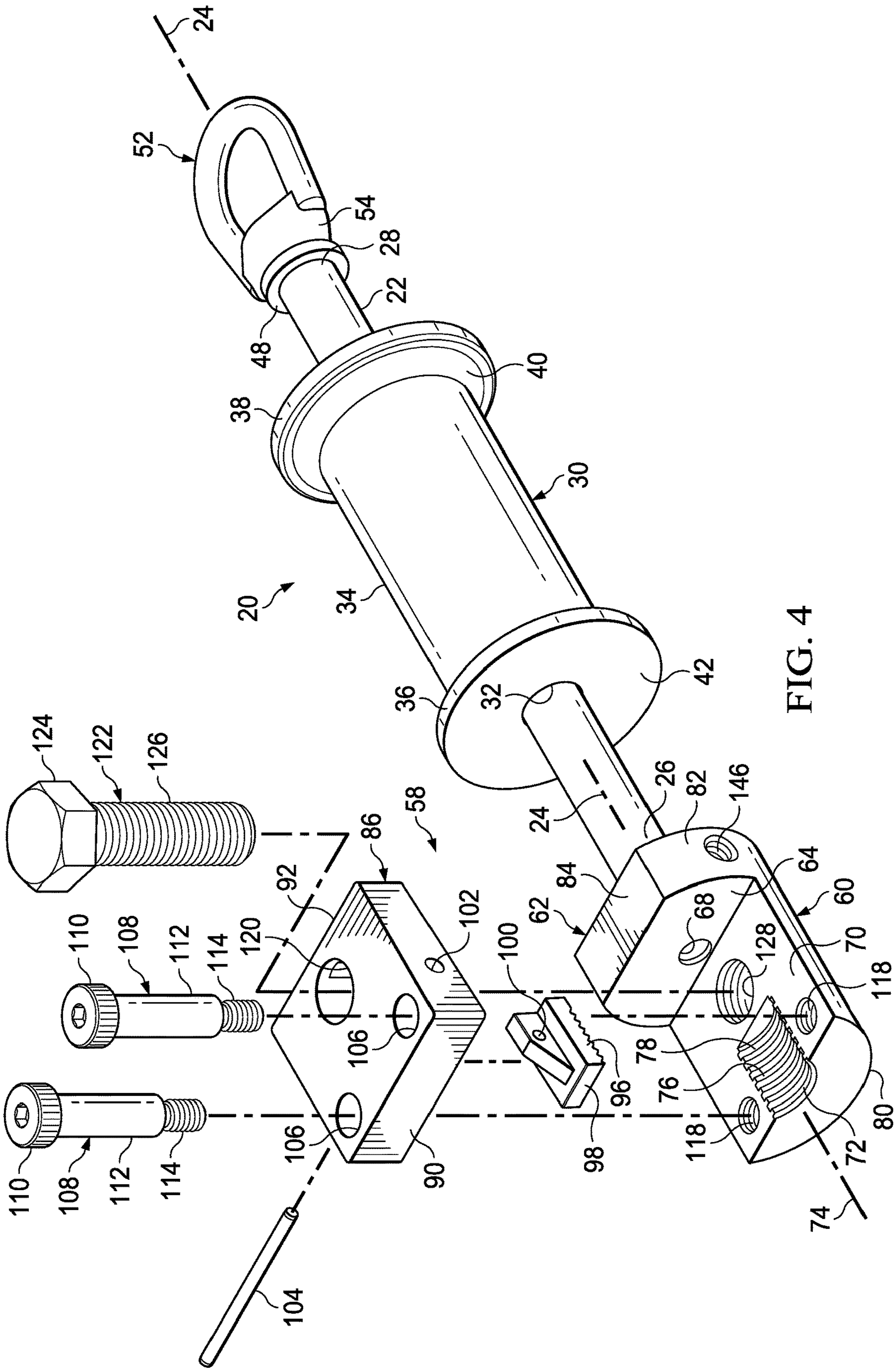
FIG. 4 is a front perspective view of the locking pin tool of FIG. 2, shown with a jaw assembly of the locking pin tool with various components of the jaw assembly exploded apart.

As shown in FIG. 4, the jaw assembly 58 further includes an opposing upper jaw body 86 having an upper jaw face 88 that faces downward toward the lower jaw face 70 of the lower jaw body 60 so that the jaw faces 70, 88 face one another. The upper jaw body 86 may have a variety of configurations. In the embodiment shown, the upper jaw body 86 is configured as a substantially square or rectangular block or member. The upper outer surface of the body 86 is flat or planar. In certain embodiments, the upper jaw body 86 may have a tapered thickness along its length so that it narrows in thickness from its forward end 90 to its rearward end 92. The jaw body 86 is a separate member from the lower jaw body 60 and jaw head 62.

The jaw face 70 of upper jaw body 86 is provided with a recess 94 configured for receiving a jaw clamp insert 96. The insert 96 is a separate member from the jaw body 86. The jaw clamp insert 96 is shown as being formed as a rectangular base, plate or block member and includes a pivot arm or member 98 that projects upward from upper surface of the insert 96. The pivot arm 98 includes a transverse aperture 100 that aligns with a corresponding transverse aperture 102 formed in the upper jaw body 86, as shown. A rollbar or hinge pin 104 passes through the apertures 100, 102 to hold the jaw clamp insert 96 within the recess 94 while allow pivoting movement about the pin 104 within the recess 94. Clearances may be provided within the recess 94 to allow and the insert 96 to pivot about the pin 104. The recess 94 may also limit the degree the jaw clamp insert 96 can pivot and move within the recess 94.

A pair of holes or apertures 106 formed through the thickness of the jaw body 86 at the forward end receive guide pins, members, or bolts 108. The guide pins, members or bolts 108 may be in the form of shoulder or stripper bolts. Such bolts have a head 110 configured for tightening with a tool or by hand, a smooth shank 112 extending from the head 110, and a threaded end portion 114. The holes or apertures 106 may be sufficiently larger than the diameter of the shank 112 to allow the jaw body 86 to freely slide along the shank 112. The threaded end portion 114 is sized and configured to be received within threaded apertures 118 formed in lower jaw face 70. The bolts 108 facilitate coupling the jaw body 86 to the lower jaw body 60 while allowing the jaw body 86 to be moved away and towards the lower jaw face 70 of the lower jaw body 60.

A non-threaded bolt hole or aperture 120 is also formed through the thickness of the jaw body 86 and may be located at or near the rearward end for receiving one or more jaw body bolts 122. The jaw body bolt 122 includes a bolt head 124 configured for engaging with a wrench or tool, such as the hexagonal bolt head shown. A threaded shank 126 of the bolt 122 passes through the aperture 120 and is received within a threaded bolt aperture 128 formed in the lower jaw body 60 at its rearward end. In some embodiments, some portion of the upper end of the shank 126 of the bolt 122 may be non-threaded, such as with a shoulder or stripper bolt, so that the upper jaw body 86 can slide along the upper portion of the shank 126. This is provided the bolt 122 has enough of a threaded portion to allow the jaw body 86 to be sufficiently tightened and loosened for engagement and disengagement of the locking pin end with which it is used, as will be described later on. The hole or aperture 120 may be sufficiently larger than the diameter of the shank 126 to allow the jaw body 86 to freely slide along the shank 126. The location of the bolt 122 and aperture 120 with respect to the upper jaw body 86 should be that which allows the jaw body 86 to be sufficiently tightened so that the jaw assembly 58 can be used and function in the manner described herein.

Because the apertures 106, 120 formed in the upper jaw body 86 are smooth or non-threaded, the jaw body 86 is movable along the lengths of the shanks 112 of guide bolts 108 and the shank 126 of bolt 122 to various laterally spaced-apart positions from the lower jaw body 60. The forward face 64 of the jaw head 62 is also spaced from the rearward end 92 of the upper jaw body 86 to provide a clearance to allow the jaw body 86 to be moved up and down to various laterally spaced-apart positions from the lower jaw body 60.

Figure 5:
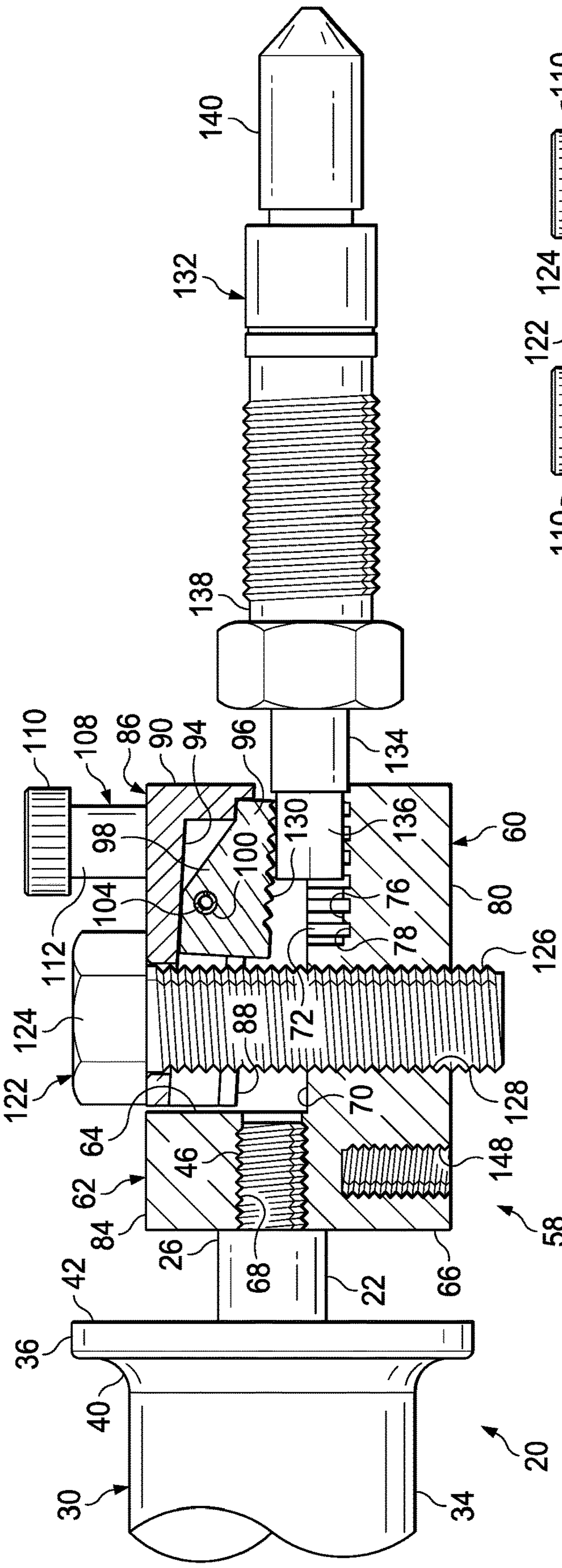
FIG. 5 is a left-side elevational view of the locking pin tool of FIG. 2, shown with the jaw assembly in cross section and engaged with a locking pin assembly during use.

Referring to FIG. 5, the jaw clamp insert 96 has a series of transverse teeth 130 projecting from its lower surface. The teeth 130 may be configured similarly to those teeth of a pipe wrench or similar tool. In this regard, some or all of the teeth 130 may be tapered along their height to a point or peak. The sidewalls of the teeth 130 may also be angled so that the that point or peak of the teeth 130 are angled rearwardly to facilitate biting or digging into the locking pin end as the tool 20 is pulled or impacted rearwardly for removal of the locking pin, as will be described later on.

The teeth 130 may be longitudinally spaced apart along the lower surface of the insert 96 a distance of from 0.01 inch to 0.30 inch, as measured from the same or similar point (e.g., from peak to peak) on the next adjacent tooth 130. In particular embodiments, the teeth 130 may be spaced apart a distance that may be at least equal to, and/or between any two of 0.01 inch, 0.02 inch, 0.03 inch, 0.04 inch, 0.05 inch, 0.06 inch, 0.07 inch, 0.08 inch, 0.09 inch, 0.10 inch, 0.11 inch, 0.12 inch, 0.13 inch, 0.14 inch, 0.15 inch, 0.16 inch, 0.17 inch, 0.18 inch, 0.19 inch, 0.20 inch, 0.21 inch, 0.22 inch, 0.23 inch, 0.24 inch, 0.25 inch, 0.26 inch, 0.27 inch, 0.28 inch, 0.29 inch, and 0.30 inch.

Each tooth 130 may extend along all or a portion of the width of the insert 96. In most instances, the teeth 130 will extend across the substantially the entire width of the insert 96 or a major portion thereof. The teeth 130 may be longitudinally spaced along all or a portion of the length of the insert 96. In most instances, the teeth 130 will be longitudinally spaced apart across substantially the entire length of the insert 96 or a major portion thereof.

The width and length of the insert 96 may be the same or similar to width and length of the channel 74 on the lower jaw body 60. In some embodiments, the insert 96 may have a width of from 0.04 inch to 3.0 inches. In certain instances, the width of the insert 96 may be at least equal to, and/or between any two of 0.4 inch, 0.5 inch, 0.6 inch, 0.7 inch, 0.8 inch, 0.9 inch, 1.0 inch, 1.1 inches, 1.2 inches, 1.3 inches, 1.4 inches, 1.5 inches, 1.6 inches, 1.7 inches, 1.8 inches, 1.9 inches, 2.0 inches, 2.1 inches, 2.2 inches, 2.3 inches, 2.4 inches, 2.5 inches, 2.6 inches, 2.7 inches, 2.8 inches, 2.9 inches, and 3.0 inches.

The length of the insert 96 may range from 0.5 inch to 3.0 inches. In certain instances, the depth length of the insert 96 may be at least equal to, and/or between any two of 0.5 inch, 0.6 inch, 0.7 inch, 0.8 inch, 0.9 inch, 1.0 inch, 1.1 inches, 1.2 inches, 1.3 inches, 1.4 inches, 1.5 inches, 1.6 inches, 1.7 inches, 1.8 inches, 1.9 inches, 2.0 inches, 2.1 inches, 2.2 inches, 2.3 inches, 2.4 inches, 2.5 inches, 2.6 inches, 2.7 inches, 2.8 inches, 2.9 inches, and 3.0 inches.

The shaft 22, hammer body 30, jaw assembly 58, and components thereof may be formed from steel, carbon steel, tool steel, stainless steel, steel alloy, iron, or other metal or metal alloy sufficient for the purposes described herein. In particular embodiments, the shaft 22 and hammer body 30 may be formed from cold drawn 1018 steel, the lower jaw head 62, lower jaw body 60, and upper jaw body 86 may be formed from 4340 steel, and the jaw clamp insert 96 may be formed from AISI type A2 tool steel.

The locking pin tool 20 is similar to that of U.S. Design application No. 29/749,678, which is incorporated herein in its entirety by reference for all purposes, including those drawings that show various features of the locking pin tool, which may the same or different from those shown and described herein.

Figure 1:
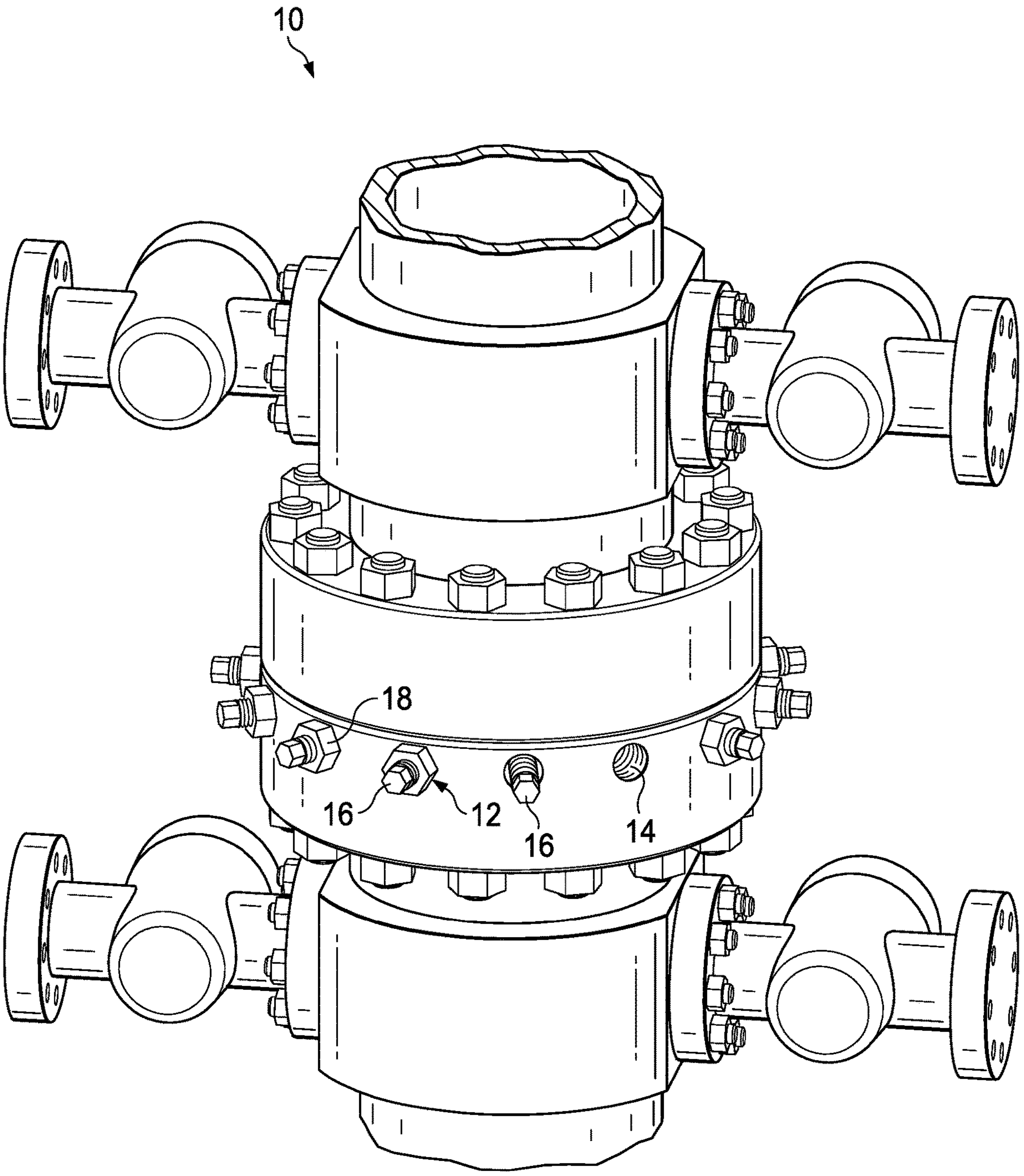
FIG. 1 (PRIOR ART)
FIG. 1 is a front perspective view of a wellhead employing locking pin assemblies circumferentially spaced around the wellhead.
Figure 6:
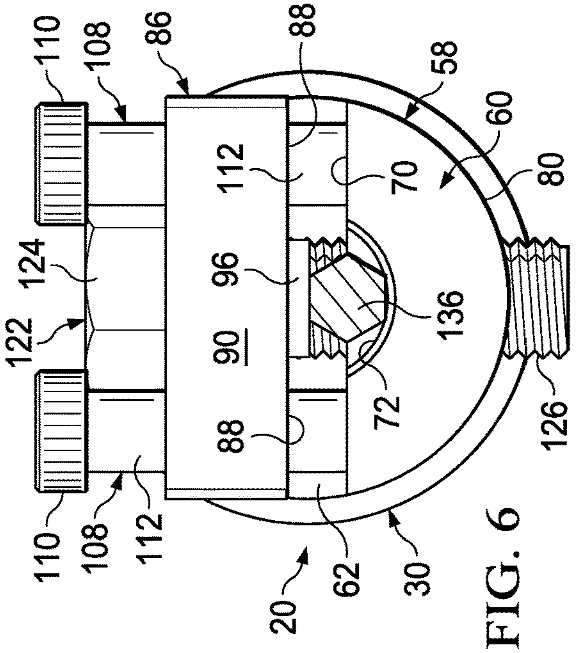
FIG. 6 is a front elevational view of the locking pin tool of FIG. 2, shown engaged with a a locking pin stem of a locking pin assembly during use, with the locking pin stem shown in cross section.

Referring to FIGS. 5 and 6, a locking pin assembly 132, which is similar to the locking pin assembly 12 of FIG. 1, is shown in use with the tool 20. The following description provides an example of engaging and radially pulling the locking pin assembly 132 when it is installed in a wellhead, such as the wellhead 10 of FIG. 1.

The locking pin assembly 132 includes a locking pin stem 134 with an outer end 136 that is configured as a nut end with nut flats that may be in a square, hexagonal, or octagonal configuration, although it could have other configurations. The outer end of the pin 136 is usually sized as a ½-inch, ¾-inch, or 1-inch nut.

During removal, the locking pin stem 134 is first unthreaded from the gland nut 138 that is engaged with a threaded opening of the wellhead, such as the opening 14 of FIG. 1, as described previously. The gland nut 138 has internal threads (not shown) that the stem 134 is threaded into. By rotating the locking pin stem 136 using the nut flats on the outer end 136 of the pin stem 134 the locking pin can be unthreaded from the gland nut 138. The gland nut 138 is then unthreaded from the threaded opening of the wellhead. Even though both the locking pin stem 136 and gland nut 138 of the locking pin assembly 132 are unthreaded, difficulty is often encountered in fully removing the locking pin stem 136 or locking pin assembly 134 because the inner end 140 of the locking pin assembly 136 may still remain strongly embedded in or be adhered to the seal or packing material within the wellhead so that it is difficult to fully remove the locking pin assembly. In some cases, the gland nut 138 may be removed from the locking pin assembly and removed from the wellhead, while the locking pin stem 134 remains embedded. To fully remove the embedded locking pin stem 136 or locking pin assembly 132, after it has been unscrewed, it must be pulled out radially from the wellhead, such as through opening 14 of FIG. 1. The tool 20 is therefore used for this purpose.

To use the tool 20, the lower and upper jaw bodies 60, 86 are loosened by loosening the bolt 122 so that the jaw faces 70, 88 are separated a sufficient distance in an open position to receive the outer end 136 of locking pin stem 134. The outer end 136 of locking pin stem 134 is then positioned between the channel 72 and jaw clamp insert 96. The bolt 122 is then tightened so that the lower and upper jaw bodies 60, 86 are brought together so the jaw faces 70, 88 are brought to a closed position. The upper jaw body 86 will move along the guide pins or bolts 108, with the bolt 122 tightening the outer end 136 between the channel 72 and insert 96 as the jaw faces 70, 88 are brought to the closed position. The pivotal insert 96 facilitates positioning of outer nut end 136 of the pin stem 134 between the jaw faces 70, 88. The bolt 122 is tightened to provide a sufficient clamping force by the upper and lower jaw faces 70, 88. This force is exerted through the channel 72 and insert 96, respectively. For many applications, the force exerted by the jaw faces 70, 88 may range from 35,000 psi to 75,000 psi when they are brought to the fully closed position.

As shown in FIG. 6, when properly positioned in the closed position, the lower corners of the outer nut end 136 of the pin stem 134 will engage the teeth 76 of the channel 72 at the corners of the nut flats of the locking pin end 136 due to its arcuate shape. The teeth 130 of the insert 96 of the upper jaw body 86 will engage and grip or bite into the nut flat at the top of the outer end 136 of locking pin stem 134. When the bolt 122 is fully tightened, there should be a sufficiently strong bite or grip of the jaw assembly 58 on the outer end 136 of the locking pin assembly 132.

With the tool 20 fully secured to the locking pin assembly 132, a user may rapidly move the hammer body 30 rearwardly along the shaft 22 between the forward end 26 and the rearward end 28 so that the hammer body 30 impacts or strikes the hammer stop 48 at the rearward end 28 of the shaft 22. This imparts a rearward longitudinal force through the shaft 22 that is exerted on the locking pin stem 134 that is held tightly within the jaw assembly 58. This facilitates removal of the locking pin assembly 132 as the longitudinal force exerted on the tool 20 corresponds to an outward radial force with respect to the locking pin assembly 132 installed on the wellhead.

This process of rapidly moving the hammer body 30 rearwardly along the shaft 22 and striking the hammer stop 48 may be repeated until the locking pin assembly 132 is fully loosened and can be removed from the wellhead.

In certain instances, a wench, come-along, pulley, vehicle hitch, etc., may be coupled to the coupling device 52 of the tool 20 to apply a force to the tool 20 to facilitate pulling or removing the locking pin assembly 132. This may done alone or in combination with the hammering process described previously.

While the tool 20 is particularly useful for removing or uninstalling locking pin assemblies from wellheads, it can also be used for installing locking pin assemblies as well. In this case, the tool 20 is secured to an uninstalled locking pin assembly that may be inserted into the locking pin opening of the wellhead. The hammer body 30 is moved in a forward direction along the shaft 22 so that the hammer body 30 impacts or strikes the rear face 66 of the jaw head 62 located at the forward end of the shaft 22. The rear face 66 of the jaw head 62 serves as a forward hammer stop so that a forward radial force can be exerted on the locking pin assembly to facilitate installing the locking pin assembly in the wellhead.

Referring to FIG. 3, in some embodiments, the tool 20 may include a removable handle 142. The handle 142 may facilitate positioning of the tool 20 on the locking pin as well as applying additional force to the tool 20 to facilitate removal and/or installation of the locking pin assemblies. The handle 142 is shown provided with a threaded end 144 that is configured for engagement with threaded apertures 146, 148, 150 that are formed on the lower jaw head 62 and spaced apart around the perimeter of the jaw head 62. The handle 142 may be selectively coupled or uncoupled from the tool 20 as needed.

While the invention has been shown in some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A locking pin tool to facilitate removal and/or installation of locking pins of a well head assembly, the locking pin tool comprising:

an elongated shaft having a longitudinal axis that extends along opposite first and second ends of the shaft;

a jaw assembly coupled to the first end of the shaft, the jaw assembly comprising a lower jaw body having a lower jaw face and an opposing upper jaw body having an upper jaw face, the lower and upper jaw faces oriented so that the jaw faces face one another, the upper jaw body being movable with respect to the lower jaw body between first and second positions to increase or decrease the distance between the upper and lower jaw faces, the jaw assembly being configured to engage an end of a locking pin when the upper and lower jaw faces are brought together, the jaw assembly further comprising a jaw clamp insert body that is pivotally mounted to the upper jaw body, the jaw clamp insert body having a series of teeth that are longitudinally spaced apart for engaging the end of the locking pin;

a jaw body fastener for engaging the upper and lower jaw bodies and selectivity tightening the jaw faces against the end of the locking pin to secure the locking pin tool thereon;

a hammer body mounted on the shaft and being movable along the shaft along lines parallel to the longitudinal axis of the shaft; and a hammer stop provided on the shaft that engages the hammer body to absorb a striking force from the hammer body as the hammer body is moved along the shaft towards the hammer stop.

2. The locking pin tool of claim 1, wherein:

the lower jaw face is provided with a concave arcuate channel or recess that has a longitudinal axis that is parallel to the longitudinal axis of the shaft.

3. The locking pin tool of claim 1, wherein:

the lower jaw face is provided with a concave arcuate channel or recess that has a longitudinal axis that is parallel to the longitudinal axis of the shaft, the concave arcuate channel or recess having a series of circumferential grooves or teeth that are longitudinally spaced apart for engaging the end of the locking pin; and wherein the series of teeth of the jaw clamp insert body directly face the concave arcuate channel or recess.

4. The locking pin tool of claim 1, wherein:

the hammer stop is provided on the second end of the shaft.

5. The locking pin tool of claim 4, wherein:

a second hammer stop is provided on the first end of the shaft that engages the hammer body as the hammer body is moved along the shaft toward the jaw assembly.

6. The locking pin tool of claim 5, wherein:

the lower jaw body forms the second hammer stop.

7. The locking pin tool of claim 1, further comprising:

a coupling device provided on the second end of the shaft to facilitate coupling the locking pin tool to an object.

8. The locking pin tool of claim 1, further comprising:

a removable handle configured to be selectively coupled to the locking pin tool.

9. The locking pin tool of claim 1, further comprising:

at least one guide member coupled to the lower jaw body that engages the upper jaw body to guide the upper jaw body as the upper jaw body is moved between the first and second positions.

10. A locking pin tool to facilitate removal and/or installation of locking pins of a well head assembly, the locking pin tool comprising:

an elongated shaft having a longitudinal axis that extends along opposite first and second ends of the shaft;

a jaw assembly coupled to the first end of the shaft, the jaw assembly comprising a lower jaw body having a lower jaw face and an opposing upper jaw body having an upper jaw face, the lower and upper jaw faces oriented so that the jaw faces face one another, the upper jaw body being movable with respect to the lower jaw body between first and second positions to increase or decrease the distance between the upper and lower jaw faces, the jaw assembly being configured to engage an end of a locking pin when the upper and lower jaw faces are brought together;

a jaw body fastener for engaging the upper and lower jaw bodies and selectivity tightening the jaw faces against the end of the locking pin to secure the locking pin tool thereon;

a hammer body mounted on the shaft and being movable along the shaft along lines parallel to the longitudinal axis of the shaft;

a hammer stop provided on the shaft that engages the hammer body to absorb a striking force from the hammer body as the hammer body is moved along the shaft towards the hammer stop, the hammer stop being provided on the second end of the shaft; and a second hammer stop provided on the first end of the shaft that engages the hammer body as the hammer body is moved along the shaft toward the jaw assembly, wherein the lower jaw body forms the second hammer stop.

11. The locking pin tool of claim 10, wherein:

the jaw assembly further comprises a jaw clamp insert body that is pivotally mounted to the upper jaw body, the jaw clamp insert body having a series of teeth that are longitudinally spaced apart for engaging the end of the locking pin; and wherein the lower jaw face is provided with a concave arcuate channel or recess that has a longitudinal axis that is parallel to the longitudinal axis of the shaft, the concave arcuate channel or recess having a series of circumferential grooves or teeth that are longitudinally spaced apart for engaging the end of the locking pin.

12. The locking pin tool of claim 10, further comprising:

a coupling device is provided on the second end of the shaft to facilitate coupling the locking pin tool to an object.

13. The locking pin tool of claim 10, further comprising:

a removable handle configured to be selectively coupled to the locking pin tool.

14. A locking pin tool to facilitate removal and/or installation of locking pins of a well head assembly, the locking pin tool comprising:

an elongated shaft having a longitudinal axis that extends along opposite first and second ends of the shaft;

a jaw assembly coupled to the first end of the shaft, the jaw assembly comprising a lower jaw body having a lower jaw face and an opposing upper jaw body having an upper jaw face, the lower and upper jaw faces oriented so that the jaw faces face one another, the upper jaw body being movable with respect to the lower jaw body between first and second positions to increase or decrease the distance between the upper and lower jaw faces, the jaw assembly being configured to engage an end of a locking pin when the upper and lower jaw faces are brought together;

a jaw body fastener for engaging the upper and lower jaw bodies and selectivity tightening the jaw faces against the end of the locking pin to secure the locking pin tool thereon;

a hammer body mounted on the shaft and being movable along the shaft along lines parallel to the longitudinal axis of the shaft;

a hammer stop provided on the shaft that engages the hammer body to absorb a striking force from the hammer body as the hammer body is moved along the shaft towards the hammer stop; and a coupling device provided on the second end of the shaft to facilitate coupling the locking pin tool to an object.

15. The locking pin tool of claim 14, wherein:

the jaw assembly further comprises a jaw clamp insert body that is pivotally mounted to the upper jaw body, the jaw clamp insert body having a series of teeth that are longitudinally spaced apart for engaging the end of the locking pin.

16. The locking pin tool of claim 14, wherein:

the lower jaw face is provided with a concave arcuate channel or recess that has a longitudinal axis that is parallel to the longitudinal axis of the shaft.

17. The locking pin tool of claim 14, wherein:

the lower jaw face is provided with a concave arcuate channel or recess that has a longitudinal axis that is parallel to the longitudinal axis of the shaft, the concave arcuate channel or recess having a series of circumferential grooves or teeth that are longitudinally spaced apart for engaging the end of the locking pin.

18. A locking pin tool to facilitate removal and/or installation of locking pins of a well head assembly, the locking pin tool comprising:

an elongated shaft having a longitudinal axis that extends along opposite first and second ends of the shaft;

a jaw assembly coupled to the first end of the shaft, the jaw assembly comprising a lower jaw body having a lower jaw face and an opposing upper jaw body having an upper jaw face, the lower and upper jaw faces oriented so that the jaw faces face one another, the upper jaw body being movable with respect to the lower jaw body between first and second positions to increase or decrease the distance between the upper and lower jaw faces, the jaw assembly being configured to engage an end of a locking pin when the upper and lower jaw faces are brought together;

a jaw body fastener for engaging the upper and lower jaw bodies and selectivity tightening the jaw faces against the end of the locking pin to secure the locking pin tool thereon;

a hammer body mounted on the shaft and being movable along the shaft along lines parallel to the longitudinal axis of the shaft;

a hammer stop provided on the shaft that engages the hammer body to absorb a striking force from the hammer body as the hammer body is moved along the shaft towards the hammer stop; and at least one guide pin, member, or bolt coupled at one end to the lower jaw body and having a shank that is received within a hole or aperture of the upper jaw body that allows the upper jaw body to slide along the shank to guide the upper jaw body as the upper jaw body is moved between the first and second positions.

19. The locking pin tool of claim 18, wherein:

the jaw assembly further comprises a jaw clamp insert body that is pivotally mounted to the upper jaw body, the jaw clamp insert body having a series of teeth that are longitudinally spaced apart for engaging the end of the locking pin.

20. The locking pin tool of claim 18, wherein:

the lower jaw face is provided with a concave arcuate channel or recess that has a longitudinal axis that is parallel to the longitudinal axis of the shaft, the concave arcuate channel or recess having a series of circumferential grooves or teeth that are longitudinally spaced apart for engaging the end of the locking pin.

* * * * *